United States Patent Office 3,186,979
Patented June 1, 1965

3,186,979
REACTIVE DYESTUFFS HAVING A DITHIOCARBAMYL-SUBSTITUTED TRIAZINE RING SUBSTITUENT
Frank Hall and Ian Durham Rattee, Manchester, England, assignors to Imperial Chemical Industries Limited, London, England, a corporation of Great Britain
No Drawing. Filed Dec. 19, 1962, Ser. No. 245,650
Claims priority, application Great Britain, Mar. 11, 1959, 8,360/59; May 21, 1959, 17,394/59; July 2, 1959, 22,761/59
9 Claims. (Cl. 260—153)

This application is a continuation-in-part application of our application Serial No. 9,199, which was filed on February 17, 1960, now abandoned.

This invention relates to new dyestuffs and more particularly it relates to new dyestuffs which are valuable for colouring natural and artificial textile materials, in particular cellulose textile materials.

According to the invention there are provided the dyestuffs of the formula:

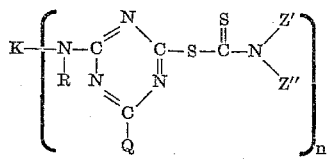

wherein K represents the radical of a dyestuff selected from the class consisting of azo, anthraquinone, nitro and phthalocyanine dyestuffs radicals.

R represents a number selected from the class consisting of hydrogen and lower alkyl;

$n$ is a positive integer not exceeding 2;

Q is a member selected from the class consisting of chlorine, bromine, lower alkyl, phenyl, lower alkoxy, sulphonic acid, phenoxy, amino, lower alkylamino, hydroxy lower alkylamino, phenylamino, sulphophenylamino, carboxyphenylamino, N-phenyl-N-lower alkylamino, N-sulphophenyl-N-lower alkylamino, carboxysulphophenylamino, N-(carboxy-sulphophenyl)-N-lower alkylamino, N-carboxyphenyl-N-lower alkylamino, disulphophenylamino, N-disulphophenyl-N-lower alkylamino, cyclohexylamino, morpholino, piperidyl and

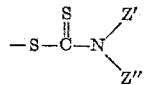

and Z' and Z" are independently selected from the class consisting of lower alkyl, phenyl lower alkyl, cyclohexyl and phenyl, and taken together Z' and Z" form with the nitrogen atom N a heterocyclic ring selected from the class consisting of piperidyl and morpholino.

As examples of the lower alkyl radicals represented by each of R and Q there may be mentioned alkyl radicals containing from 1 to 4 carbon atoms, in particular the methyl radical.

As examples of the lower alkoxy radicals represented by Q there may be mentioned alkoxy radicals containing from 1 to 4 carbon atoms, in particular the methoxy radical.

As examples of the lower alkylamino groups represented by Q there may be mentioned N-(lower alkyl)-amino and N:N-di(lower alkyl)amino groups, wherein lower alkyl represents an alkyl radical of from 1 to 4 carbon atoms, and as examples of such groups there may be mentioned methylamino, ethylamino, propylamino, dimethylamino, diethylamino, dipropylamino, dibutylamino and N-methyl-N-ethylamino groups. As examples of the hydroxy lower alkylamino groups represented by Q there may be mentioned N-(hydroxy lower alkyl)amino and N:N-di-(hydroxy lower alkyl)amino groups such as N-(β-hydroxyethyl)amino and N:N-di(β-hydroxyethyl)amino groups.

As examples of the sulphophenylamino, carboxyphenylamino, disulphophenylamino and carboxysulphophenylamino groups represented by Q there may be mentioned 2-, 3- or 4-sulphophenylamino, 2-, 3- or 4-carboxyphenylamino, 2:5-, 3:5- or 2:4-disulphophenylamino and 4- or 5-sulpho-2-carboxyphenylamino groups.

As examples of the N-phenyl-N-lower alkylamino, N-sulphophenyl-N-lower alkylamino, N-carboxyphenyl-N-lower alkylamino, N-disulphophenyl-N-lower alkylamino and N-(carboxysulphophenyl)-N-lower alkylamino groups represented by Q there may be mentioned N-phenyl-N-methylamino, N-phenyl-N-ethylamino, N-phenyl-N-n-propylamino, N-(2-, 3- or 4-sulphophenyl)-N-methylamino, N-(2, 3, or 4-carboxyphenyl)-N-methylamino, N-(2:5-, 3:5- or 2:4-disulphophenyl)-N-methylamino and N-(4- or 5-sulpho-2-carboxyphenyl)-N-methylamino groups.

As examples of the lower alkyl radicals represented by each of Z' and Z" there may be mentioned methyl, ethyl, propyl and butyl radicals; and as an example of a phenyl lower alkyl radical represented by each of Z' and Z" there may be mentioned the benzyl radical.

Each of the groups of the formula:

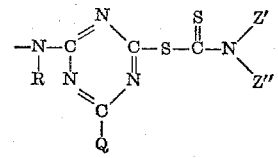

Formula I present in the dyestuffs of the invention is attached to a carbon atom present in the dyestuff radical represented by K. The said carbon atom may form part of an aryl ring, in particular a benzene or naphthalene ring, present in K or may form part of an alkyl chain which is directly or indirectly attached to an aryl ring present in K.

It is preferred that the dyestuff radical represented by K contains at least one water-solubilising group such as a carboxylic acid, sulphonamide, lower alkylsulphone, and, above all, a sulphonic acid group. If desired the dyestuff radical represented by K may also contain a coordinately bound metal atom such as a coordinately bound copper, chromium or cobalt atom.

The dystuffs of the invention may be obtained by reacting a dyestuff compound of the formula:

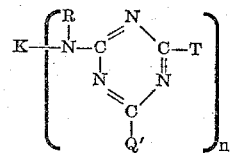

Formula II wherein K, R and $n$ have the meanings stated, T represents a chlorine or a bromine atom and Q' represents chlorine, bromine, lower alkyl, phenyl, lower alkoxy, sulphonic acid, phenoxy, amino, lower alkylamino, hydroxy lower alkylamino, phenylamino, sulphophenylamino, carboxylamino, N-phenyl-N-lower alkylamino, N-sulphophenyl-N-lower alkylamino, carboxysulphophenylamino, N-(carboxysulphophenyl)-N-lower alkylamino, N-carboxyphenyl-N-lower alkylamino, disulphophenylamino, N-disulphophenyl-N-lower alkylamino, cyclohexylamino, morpholino or piperidyl, with a sulphur compound of the formula:

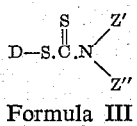

Formula III wherein Z' or Z" have the meanings stated above, and D represents a metal atom, which is preferably an alkali metal atom such as sodium or potassium.

This reaction may be conveniently brought about by adding a solution of the dyestuff compound of Formula II in water or in an organic liquid, which is preferably a water-soluble organic liquid such as acetone, or in a mixture of water and a water-soluble organic liquid, to an aqueous solution of the sulphur compound of Formula III, stirring the mixture, preferably at a temperature below 50° C., for example at a temperature between 20° C. and 30° C., if necessary adding sodium carbonate to maintain the pH of the mixture between 5 and 10, filtering off the dyestuff which is precipitated. If necessary water and/or sodium chloride can be added to ensure complete precipitation of all the dyestuff.

When T and Q' each represent chlorine or bromine atoms then it is possible by suitable choic of the reaction conditions to react one or both of the chlorine or bromine atoms with the sulphur compound. In general it is found that by carrying out the reaction at a temperature between 0° and 10° C., only one of the said chlorine or bromine atoms reacts with the sulphur compound, whereas at higher temperatures both of the chlorine or bromine atoms react with the sulphur compound.

The sulphur compounds of Formula III may themselves be obtained by reaction a secondary amine of the formula:

wherein Z' and Z" have the meanings stated above, with carbon disulphide in water in the presence of an alkali metal hydroxide, at a temperature between 0° and 30° C. and at pH above 12, adding sodium chloride, filtering off the precipitated compound, washing it with toluene and drying it at a temperature below 45° C.

As examples of the sulphur compounds of Formula III there may be mentioned sodium diethyldithiocarbamate, sodium pentamethylenedithiocarbamate, sodium dimethyldithiocarbamate, potassium dipropyldithiocarbamate, sodium N-methyl-N-propyldithiocarbamate, sodium N-methyl-N-ethyldithiocarbamate, sodium diphenyldithiocarbamate, sodium N-phenyl-N-methyldithiocarbamate, sodium dicyclohexyldithiocarbamate, potassium di-n-butyldithiocarbamate, sodium 4-morpholinodithiocarbamate, sodium diiso-butyldithiocarbamate, sodium N-methyl-N-cyclohexyldithiocarbamate and sodium N-benzyl-N-ethyldithiocarbamate. Such compounds may if desired be used in the form of their hydrates with water.

The dyestuff compounds of Formula II may themselves be obtained by reacting a dyestuff compound of the formula K—(NHR)$_n$, wherein K, R and $n$ have the meanings stated above, with a 1:3:5-triazine of the formula:

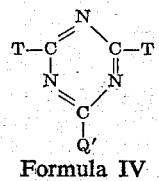

Formula IV wherein T and Q' have the meanings stated, one molecular proportion of the said 1:3:5-triazine being used for each —NHR group present in the dyestuff compound.

As example of such 1:3:5-triazines there may be mentioned cyanuric chloride, cyanuric bromide, 2-methyl-4:6-dichloro-1:3:5-triazine, 2-methoxy-4:6-dichloro-1:3:5-triazine, 2-phenyl-4:6-dichloro-1:3:5-triazine, 2-phenoxy-4:6-dichloro-1:3:5-triazine, 2-methylamino-4:6-dichloro-1:3:5-triazine, 2-ethylamino-4:6-dichloro-1:3:5-triazine, 2-N:N-diethylamino-4:6-dichloro-1:3:5-triazine, 2-phenylamino-4:6-dichloro-1:3:5-triazine, 2-phenylamino-4:6-dibromo-1:3:5-triazine, 2-(2'-, 3'- or 4'-sulphophenylamino)-4:6-dichloro-1:3:5-triazine and 2-(3':5'-disulphophenylamino)-4:6-dichloro-1:3:5-triazine.

Each of the —NHR groups present in the said dyestuff compounds is directly attached to a carbon atom of an aryl residue present in the dyestuff compound or each of the —NHR groups is attached to a carbon atom of an alkyl radical which is directly attached to an aryl residue present in the dyestuff compound or which is attached to an aryl residue through a bridging atom or group. As examples of such bridging atoms or groups there may be mentioned —O—, —S—, —NH—, —N-alkyl, —SO$_2$—, —SO$_2$NH—, —CONH— and —SO$_2$N-alkyl. The said dyestuff compounds of the formula K-(NHR)$_n$ may be obtained by any of the methods known for preparing dyestuffs containing amino or substituted amino groups. Thus, for example, an azo compound containing one or two —NHR groups, where R has the meaning stated above, may be obtained by coupling a diazotised amine with a coupling component, the amine and coupling component being so chosen that the resulting azo dyestuff contains one or two —NHR groups, or contains one or two groups, for example one or two —NR.COCH$_3$ groups, which are readily convertible to —NHR groups.

As examples of the said dyestuff compounds of the formula K-(NHR)$_n$, as hereinbefore defined, there may be mentioned the dyestuff compounds of the following classes without, however, limiting the classes to those specifically described.

(1) Dyestuff compounds of the formula:

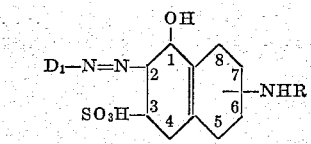

wherein D$_1$ represents a phenyl or a naphthyl radical which may contain further substituents, and the —NHR group is preferably attached to the 6- or 7-position of the naphthalene nucleus.

Particularly valuable dyestuff compounds are those wherein D$_1$ represents a phenyl radical which contains an —SO$_3$H group in ortho position to the azo link and, if desired, the phenyl radical may be further substituted by, for example, halogen atoms such as chlorine, alkyl radicals such as methyl, acylamino groups such as acetylamino, alkoxy radicals such as methoxy, and sulphonic acid groups, and those wherein D$_1$ represents a 1-sulpho-2-naphthyl radical.

Also in this class are the dyestuff compounds wherein D$_1$ represents a radical of the azobenzene, azonaphthalene or phenylazonaphthalene series.

(2) Dyestuff compounds of the formula:

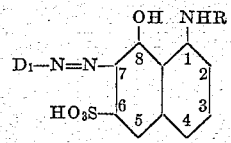

wherein D$_1$ has the meaning stated above and the naphthalene nucleus contains a sulphonic acid group in either the 3- or the 4-position. D$_1$ is preferably a phenyl radical which contains a sulphonic acid group which is preferably in an ortho position to the —N=N— link, or D$_1$ is a 1-sulpho-2-naphthyl radical.

(3) Dyestuff compounds of the formula:

wherein $D_2$ stands for a phenyl or naphthyl radical which may contain further substituents and is preferably a disulphonaphthylene radical, and the benzene nucleus may contain further substituents such as halogen atoms, alkyl radicals, alkoxy radicals and acylamino groups.

(4) Dyestuff compounds of the formula:

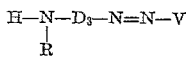

wherein $D_3$ represents an arylene radical which may contain further substituents and V represents the residue of a naphthol sulphonic acid which may contain further substituents, or the residue of a ketomethylene compound such as the residue of an acetoacetarylide or a 5-pyrazolone. $D_3$ preferably represents a sulphophenylene radical.

(5) Dyestuff compounds of the formula:

wherein $D_4$ represents an aryl radical, preferably a phenyl or naphthyl radical, which may contain further substituents such as a sulphonic acid group and/or an azo group and $K_2$ represents the residue of a coupling component which contains a —CO.CH$_2$ group, such as an acetoacetarylide or a 5-pyrazolone.

(6) The metal complexes, in particular the copper, chromium or cobalt complexes, of the dyestuff compounds of classes 1, 2, 4 and 5 which contain a metallisable group, in particular a hydroxy, carboxy or lower alkoxy group, attached to $D_1$, $D_3$ or $D_4$ in ortho position to the azo group.

(7) Dyestuff compounds of the formula:

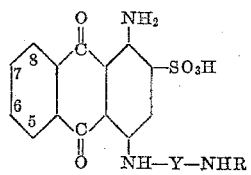

wherein the anthraquinone nucleus may contain an additional sulphonic acid group in the 5-, 6-, 7- or 8-position and Y represents a bridging group which is preferably a phenylene radical which may contain further substituents such as a sulphonic acid group.

(8) Dyestuff compounds of the formula:

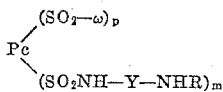

wherein Pc represents a phthalocyanine radical and is preferably a copper phthalocyanine radical, ω represents —OH and/or —NH$_2$, Y represents a bridging group, preferably an aliphatic, cycloaliphatic or aromatic bridging group, $p$ and $m$ each represent 1, 2 or 3 and may be the same or different provided that $p+m$ is not greater than 4.

As specific examples of the said dyestuff compounds of the formula: K-(NHR)$_n$ there may be mentioned:

6-amino-1-hydroxy-2-(2'-sulphophenylazo)napthalene-3-sulphonic acid,
6-methylamino-1-hydroxy-2-(4'-acetylamino-2'-sulphophenylazo)naphthalene-3-sulphonic acid,
8-amino-1-hydroxy-2-(2'-sulphophenylazo)-naphthalene-3:6-disulphonic acid,
8-amino-1-hydroxy-2-(4'-chloro-2'-sulphophenylazo)-naphthalene-3:5-disulphonic acid,
7-amino-2-(2':5'-disulphophenylazo)-1-hydroxy-naphthalene-3-sulphonic acid,
7-methylamino-2-(2'-sulphophenylazo)-1--hydroxy-naphthalene-3-sulphonic acid,
7-methylamino-2-(4'-methoxy-2'-sulphophenylazo)-1-hydroxynaphthalene-3-sulphonic acid,
8-(3'-aminobenzoylamino)-1-hydroxy-2-(2'-sulphophenylazo)naphthalene-3:6-disulphonic acid,
8-amino-1-hydroxy-2:2'-azonaphthalene-1':3:5':6-tetrasulphonic acid,
8-amino-1-hydroxy-2:2'-azonaphthalene-1':3:5'-trisulphonic acid,
6-amino-1-hydroxy-2:2'-azonaphthalene-1':3:5'-trisulphonic acid,
7-amino-1-hydroxy-2:2'-azonaphthalene-1':3-disulphonic acid,
8-amino-1-hydroxy-2-(4'-hydroxy-3'-carboxyphenylazo)naphthalene-3:6-disulphonic acid,
6-amino-1-hydroxy-2-(4'-hydroxy-3'-carboxyphenylazo)naphthalene-3:5-disulphonic acid.

8-amino-1-hydroxy-2-[4'-(2''-sulphophenylazo)-2'-methoxy-5'-methylphenylazo]naphthalene-3:6-disulphonic acid,
8-amino-1-hydroxy-2-[4'-(4''-methoxyphenylazo)-2'-carboxy-phenylazo]naphthalene-3:6-disulphonic acid,
8-amino-1-hydroxy-2-[4'-(2''-hydroxy-3'':6''-disulpho-1''-naphthylazo)-2'-carboxyphenylazo]naphthalene-3:6-disulphonic acid,
4:4'-bis(8''-amino-1''-hydroxy-3'':6''-disulpho-2''-naphthylazo)-3:3'-dimethoxydiphenyl,
6-amino-1-hydroxy-2-[4'-(2''-sulphophenylazo)-2'-methoxy-5'-methylphenylazo]naphthalene-3:5-disulphonic acid.

2-(4'-amino-2'-methylphenylazo)naphthalene-4:8-disulphonic acid,
2-(4'-amino-2'''-acetylaminophenylazo)naphthalene-5:7-disulphonic acid,
4-nitro-4'-(4''-methylaminophenylazo)stilbene-2:2'-disulphonic acid,
4-nitro-4'-(4''-amino-2''-methyl-5''-methoxyphenylazo)stilbene-2:2'-disulphonic acid,
4-amino-4'-(4''-methyloxyphenylazo)stilbene-2:2'-disulphonic acid,
4-amino-2-methylazobenzene-2':5'-disulphonic acid.

1-(2':5'-dichloro-4'-sulphophenyl)-3-methyl-4-(3''-amino-4''-sulphophenylazo)-5-pyrazolone,
1-(4'-sulphophenyl)-3-carboxy-4-(4''-amino-3''-sulphophenylazo)-5-pyrazolone,
1-(2'-methyl-5'-sulphophenyl)-3-methyl-4-(4''-amino-3''-sulphophenylazo)-5-pyrazolone,
1-(2'-sulphophenyl)-3-methyl-4-(3''-amino-4''-sulphophenylazo)-5-pyrazolone,
4-amino-4''-(3''-methyl-1''-phenyl-4''-pyrazol-5''-onylazo)stilbene-2:2'-disulphonic acid,
4-amino-4''-(2''-hydroxy-3'':6''-disulpho-1''-naphthylazo)stilbene-2:2'-disulphonic acid,
8-acetylamino-1-hydroxy-2-(3'-amino-4'-sulphophenylazo)naphthalene-3:6-disulphonic acid,
7-(3'-sulphophenylamino)-1-hydroxy-2-(4'-amino-2'-carboxyphenylazo)naphthalene-3-sulphonic acid,
8-phenylamino-1-hydroxy-2-(4'-amino-2'-sulphophenylazo)naphthalene-3:6-disulphonic acid,
6-acetylamino-1-hydroxy-2-(5'-amino-2'-sulphophenylazo)-naphthalene-3-sulphonic acid.

1-(3'-aminophenyl)-3-methyl-4-(2':5'-disulphophenylazo)-5-pyrazolone,
1-(3'-aminophenyl)-3-carboxy-4-(2'-carboxy-4'-sulphophenylazo)-5-pyrazolone,
4-amino-4'-[3'''-methyl-4''-(2''':5''''-disulphophenylazo)-1''-pyrazol-5''-onyl]stilbene-2:2'-disulphonic acid,
1-(3'-aminophenyl)-3-carboxyl-4-[4''-(2''':5'''-disulphophenylazo)-2''-methoxy-5''-methylphenylazo]-5-pyrazolone.

The copper complex of 8-amino-1-hydroxy-2-(2'-hydroxy-5'-sulphophenylazo)naphthalene-3:6-disulphonic acid,
The copper complex of 6-amino-1-hydroxy-2-(2'-hydroxy-5'-sulphophenylazo)naphthalene-3-sulphonic acid, The copper complex of 6-amino-1-hydroxy-2-(2'-hydroxy-5'-sulphophenylazo)naphthalene-3:5-disulphonic acid, The copper complex of 8-amino-1-hydroxy-2-(2'-hydroxy-3'-chloro-5'-sulphophenylazo)naphthalene-3:6-disulphonic acid, The copper complex of 6-methylamino-1-hydroxy-2-(2'-carboxy-5'-sulphophenylazo)naphthalene-3-sulphonic acid, The copper complex of 8-amino-1-hydroxy-2-[4'-(2''-sulphophenylazo)-2'-methoxy-5'-methylphenylazo]naphthalene-3:6-disulphonic acid, The copper complex of 6-amino-1-hydroxy-2[4'-(2''':5''-disulphophenylazo)-2'-methoxy-5'-methylphenylazo]-naphthalene-3:5-disulphonic acid, The copper complex of 1-(3'-amino-4-sulphophenyl)-3-methyl-4-[4''-(2''':5'''-disulphophenylazo)-2''-methoxy-5''-methylphenylazo]-5-pyrazolone, The copper complex of 7-(4'-amino-3'-sulphoanilino)-1-hydroxy-2-[4''-(2''':5'''-disulphophenylazo)-2''-methoxy-5''-methylphenylazo]naphthalene-3-sulphonic acid, The copper complex of 6-(4'-amino-3'-sulphoanilino)-1-hydroxy-2-(2''-carboxyphenylazo)-naphthalene-3-sulphonic acid, The 1:2-chromium complex of 7-amino-6'-nitro-1:2'-dihydroxy-2:1'-azonaphthalene-3':4'-disulphonic acid, The 1:2-chromium complex of 6-amino-1-hydroxy-2-(2'-carboxyphenylazo)naphthalene-3-sulphonic acid, The 1:2-chromium complex of 8-amino-1-hydroxy-2-(4'-nitro-2'-hydroxyphenylazo)naphthalene-3:6-disulphonic acid, The 1:2-cobalt complex of 6-(4'-amino-3'-sulphoanilino)-1-hydroxy-2-(5''-chloro-2''-hydroxyphenylazo)naphthalene-3-sulphonic acid, The 1:2-chromium complex of 1-(3'-amino-4'-sulphophenyl)-3-methyl-4-(2''-hydroxy-4''-sulpho-1'''-naphthylazo)-5-pyrazolone, The 1:2-chromium complex of 7-(4'-sulphoanilino)-1-hydroxy-2-(4''-amino-2''-carboxyphenylazo)naphthalene-3-sulphonic acid, The 1:2-chromium complex of 1-(3'-aminophenyl)-3-methyl-4-(4''-nitro-2''-carboxyphenylazo)-5-pyrazolone.

1-amino-4-(3'-amino-4'-sulphoanilino)anthraquinone-2-sulphonic acid, 1-amino-4-(4'-amino-3'-sulphoanilino)anthraquinone-2:5-disulphonic acid, 1-amino-4-[4'-(4''-amino-3''-sulphophenyl)anilino]-anthraquinone-2:5-disulphonic acid, 1-amino-4-[4''-amino-2''-sulphophenylazo)anilino]-anthraquinone-2:5-disulphonic acid, 1-amino-4-(4'-methylamino-3'-sulphoanilino)anthraquinone-2-sulphonic acid.

3-(3'-amino-4'-sulphophenyl)sulphamyl copper phthalocyanine-tri-3-sulphonic acid, Di-4-(3'-amino-4'-sulphophenyl)sulphamyl copper phthalocyanine-di-4-sulphonic acid, Copper phthalocyanine 3-sulphon-N-(3'-amino-4'-sulphophenyl)amide 3-sulphonamide 3-sulphonic acid, Copper phthalocyanine 3-sulphon-N-(4'-amino-3'-sulphophenyl)amide 3-sulphonamide 3-sulphonic acid.

3-(3'-aminophenylsulphamyl)-3-sulphamyl-copper phthalocyanine-di-3-sulphonic acid, and 4-amino-2'-nitro-diphenylamine-3:4'-disulphonic acid.

Dyestuff compounds of Formula I, as hereinbefore defined, which can be used to obtain the dyestuffs of the invention are described in British specifications Nos. 209,723, 298,494, 467,815, 503,609, 772,030, 774,925, 775,308, 780,591, 781,930, 784,221, 785,120, 785,222, 805,562, 812,957, 825,377 and 826,405, in Belgian specifications Nos. 556,092, 558,390, 558,801, 558,816, 558,817, 558,884, 558,957, 559,782, 559,945, 560,791, 560,792, 560,793, 560,794, 560,795, 560,839, 563,439, 563,862, 568,297, 568,832, 569,115, 570,122, 570,343, 571,238, 571,523, 571,893, 571,942, 572,491, 572,833, 572,967 and 581,401, in Italian specifications Nos. 577,309, 582,676, 584,124 and 594,999, and in United States specifications Nos. 2,258,977, 2,680,129, 2,860,128, 2,873,269, 2,891,941 and 2,910,464.

Alternatively the new dyestuffs, as hereinbefore defined, can be obtained by reacting a dyestuff compound of the formula: $K(NHR)_n$ wherein K, R and n have the meanings stated above, with a 1:3:5-triazine of the formula:

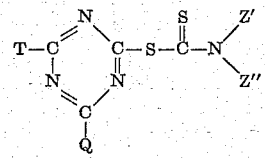

Formula V wherein T, Q, Z' and Z'' have the meanings stated, one molecular proportion of the said 1:3:5-triazine being used for each —NHR group present in the dyestuff compound.

This alternative method may be conveniently brought about by adding a solution of the said dyestuff compound in water or in a water-soluble organic liquid or in a mixture of water and a water-soluble organic liquid, to a solution or suspension of the said triazine in water and/or a water-miscible organic liquid, stirring the mixture, preferably at a temperature between 0° C. and 30° C., adding sodium carbonate to maintain the pH of the mixture between 5 and 10, filtering off the dyestuff which is precipitated. If necessary water and/or sodium chloride can be added to ensure complete precipitation of all the dyestuff.

The 1:3:5-triazines of Formula V may themselves be obtained by reacting a 1:3:5-triazine of Formula IV with a sulphur compound of Formula III.

Alternatively the dyestuffs wherein K represents the radical of an azo dyestuff may be obtained by coupling a diazotised amine with a coupling component, the amine and coupling component together containing one or two groups of Formula I. This may be conveniently brought about by adding sodium nitrite to a solution or suspension of the amine, which may be an aminoazo compound, in an aqueous solution of hydrochloric acid and adding the so-obtained solution or suspension of the diazo compound to a solution of the coupling component and isolating, by conventional methods, the azo dyestuff which is formed.

The amines and coupling components containing at least one group of Formula I may themselves be obtained by treating the corresponding primary amine or coupling component containing at least one —NHR group with (a) a 1:3:5-triazine of Formula V, or (b) a 1:3:5-triazine of Formula IV and then with a sulphur compound of Formula III.

Alternatively the dyestuffs, as hereinbefore defined, wherein Q represents lower alkoxy, sulphonic acid, phenoxy, amino, lower alkylamino, hydroxy lower alkylamino, phenylamino, sulphophenylamino, carboxyphenylamino, N-phenyl-N-lower alkylamino, N-sulphophenyl-N-lower alkylamino, N-(carboxy-sulphophenyl)-N-lower alkylamino, N-carboxy-phenyl-N-lower alkylamino, disulphophenylamino, N-disulphophenyl-N-lower alkylamino, cyclohexylamino, morpholino and piperidyl, may be obtained by reacting a dyestuff as hereinbefore defined wherein Q represents chlorine or bromine, with a compound of the formula: P—G wherein P represents a hydrogen or a metal atom and G represents lower alkoxy, sulphonic acid, phenoxy, amino, lower alkylamino, hydroxy lower alkylamino, phenylamino, sulphophenylamino, carboxyphenylamino, N-phenyl - N - lower alkylamino, N - sulphophenyl-N-lower alkylamino, N - (carboxy - sulphophenyl)-N-lower alkylamino, N-carboxyphenyl - N - lower alkylamino, disulphophenylamino, N - disulphophenyl - N - lower alkylamino, cyclohexylamino, morpholino and piperidyl.

This process may be conveniently brought about by stirring a mixture of the compound of the formula: P—G and the new dyestuff, as hereinbefore defined, in water, or in a water-miscible organic liquid, or in a mixture of water and a water-miscible organic liquid, preferably at a temperature between 0° and 100° C., adding sodium carbonate to maintain the pH of the mixture between 5 and 10, and filtering off the dyestuff which is precipitated. If necessary water and/or sodium chloride can be added to ensure complete precipitation of all the dyestuff.

As examples of compounds of the formula: P—G which may be used there may be mentioned methanol, phenol, ammonia, methylamine, diethylamine, aniline, metanilic acid, sodium sulphite, β-hydroxyethylamine, di(β-hydroxyethylamine), cyclohexylamine, morpholine, N-methylaniline, sulphanilic acid, aniline-2:4-, 2:5- or 3:5-disulphonic acid and 4- or 5-sulphoanthranilic acid.

If desired the new dyestuffs, as hereinbefore defined, can be isolated from the medium in which they have been formed and/or subsequently dried in the presence of a buffering agent. As examples of buffering agents which can be used for this purpose there may be mentioned buffering agents derived from phosphates such as sodium dihydrogen phosphate and disodium hydrogen phosphate, citrates such as sodium citrate, borates and dialkylmetanilic acid such as sodium diethylmetanilate, which is preferably used in conjunction with sodium hydrogen sulphate.

Preferred classes of dyestuffs of the invention are the dyestuffs which are represented by the formulae

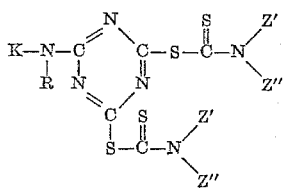

and

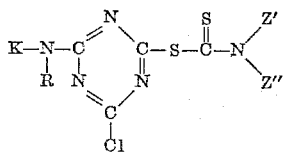

In these preferred classes it is further preferred that K is a radical of a dyestuff selected from the class consisting of azo, anthraquinone and phthalocyanine dyestuff radicals which, preferably, contains at least one water-solubilising group selected from the class consisting of sulphonic acid and carboxylic acid groups, that R is a hydrogen atom, and that Z′ and Z″ each represent lower alkyl radicals, in particular ethyl radicals.

The new dyestuffs, as hereinbefore defined, are valuable for colouring natural and artificial textile materials for example textile materials comprising cotton, viscose rayon, regenerated cellulose, wool, silk, cellulose acetate, polyamides, polyacrylonitrile, modified polyacrylonitrile and aromatic polyester fibres. For this purpose the dyestuffs can be applied to the textile materials by dyeing, padding or printing using printing pastes containing the conventional thickening agents or oil-in-water emulsions or water-in-oil emulsions, whereby the textile materials are coloured in bright shades possessing excellent fastness to light and to wet treatments such as washing. It is also found that the dyestuffs build-up well to give heavy depths of shade on textile materials.

The dyestuffs of the invention have excellent stability to storage, that is to say the dyestuffs undergo little or no loss in strength when stored either at normal temperatures for example at 20° C., or at elevated temperatures, for example at 60° C.; and in this respect they are superior to the corresponding known dyestuffs having chlorine or bromine atoms attached to the triazine ring instead of

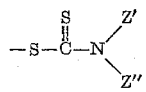

groups.

The new dyestuffs which contain water-solubilising groups, for example sulphonic acid and carboxylic acid groups, which render them soluble in water are particularly valuable for colouring cellulose textile materials. For this purpose the dyestuffs are preferably applied to the cellulose textile material in conjunction with a treatment with an acid-binding agent, for example sodium carbonate, sodium metasilicate, trisodium phosphate or sodium hydroxide, which may be applied to the cellulose textile material before, during or after the application of the dyestuff. Alternatively when the dyed textile material is to be subsequently heated or steamed a substance such as sodium bicarbonate or sodium trichloroacetate, which on heating or steaming liberates an acid-binding agent, can be used.

For example the cellulose textile material can be coloured by treating the cellulose textile material with an aqueous solution or suspension of the acid-binding agent and then immersing the so-treated cellulose textile material in a dyebath comprising a solution or dispersion of one or more of the new dyestuffs, as hereinbefore defined, at a temperature of between 0° and 100° C., removing the dyed cellulose textile material from the dyebath and if desired subjecting the dyed cellulose textile material to a treatment in a hot aqueous solution of soap.

If desired the cellulose textile material which has been treated with an aqueous solution or suspension of the acid-binding agent may be passed between rollers to remove excess aqueous solution or suspension of the acid-binding agent and/or dried before being treated with the aqueous solution or dispersion of the said dyestuffs.

Alternatively the aqueous solution or dispersion of the dyestuff may be applied by padding to the cellulose textile material which has been treated with the acid-binding agent and the cellulose textile material then passed through rollers and subsequently subjected to the action of heat or steam. Alternatively the cellulose textile material can be padded with an aqueous solution or dispersion of one or more of the new dyestuffs, as hereinbefore defined, which also contains an acid-binding agent, passing the so-treated cellulose textile material through rollers, then if desired drying the cellulose textile material at a suitable temperature, for example 70° C., and then subjecting the cellulose textile material to the action of heat or steam. Alternatively the cellulose textile material can be dyed by immersing it in a dyebath comprising an aqueous solution or dispersion of the one or more of the said dyestuffs which also contains an acid-binding agent, at a suitable temperature for example between 0° and 100° C., and thereafter removing the cellulose textile material from the dyebath, if desired subjecting it to a treatment in a hot aqueous solution of soap and finally drying the dyed cellulose textile material. Alternatively the aqueous solution or dispersion of one or more of the said dyestuffs can be applied to the cellulose textile material by a dyeing or a padding method and the coloured cellulose textile material subsequently immersed in an aqueous solution or suspension of the acid-binding agent, preferably at a temperature between 50° C. and 100° C., or alternatively the coloured cellulose textile material may be padded with an aqueous solution or suspension of the acid-binding agent, the textile material dried and then subjected to the action of heat or steam. Alternatively the cellulose textile material can be dyed by immersing it in a dyebath comprising an aqueous solution or dispersion of one or more of the said dyestuffs, preferably at a temperature between 20° and 100° C., and, after the textile material has absorbed some or all of the dyestuffs, adding an acid-binding agent and proceeding with the dyeing at the same or a different temperature.

The concentration of the acid-binding agent present in the aqueous solution or suspension or in the aqueous dispersion of the dyestuffs is not critical but it is preferred to use between 0.1% and 10% of the acid-binding agent based on the total weight of the aqueous solution or suspension. If desired the aqueous solution or suspension of the acid binding agent may also contain further substances, for example electrolytes such as sodium chloride and sodium sulphate.

The aqueous solution or dispersion of the one or more of the said dyestuffs may also contain substances which are known to assist the application of dyestuffs to textile materials, for example sodium chloride, sodium sulphate, urea, dispersing agents, surface active agents, sodium alginate or an emulsion of an organic liquid, for example, trichloroethylene in water.

Alternatively the cellulose textile materials can be printed with a printing paste containing one or more of the new dyestuffs of the invention.

This may be conveniently brought about by applying a printing paste containing one or more of the said dyestuffs, to a cellulose textile material which has been impregnated with an acid-binding agent and thereafter subjecting the printed cellulose textile material to the action of heat or steam. Alternatively a printing paste containing one or more of the said dyestuffs and containing an acid-binding agent can be applied to the cellulose textile material and the printed cellulose textile material subsequently subjected to the action of heat or steam. Alternatively a printing paste containing one or more of the said dyestuffs can be applied to the cellulose textile material which is subsequently immersed in a hot aqueous solution or suspension of the acid-binding agent or alternatively the printed textile material is impregnated with an aqueous solution or suspension of the acid-binding agent and subsequently subjected to the action of heat or steam.

After applying the printing paste to the cellulose textile material the printed textile material may, if desired, be dried, for example at a temperature between 20° and 100° C., before the printed textile material is subjected to the action of heat or steam.

The cellulose textile material may be printed with the printing paste by any of the commonly known methods of applying printing pastes to textile materials, for example by means of roller printing, screen printing, block printing, spray printing or stencil printing. The printing pastes may also contain the commonly used adjuvants, for example urea, thickening agents, for example methyl cellulose, starch, locust bean gum, sodium alginate, water-in-oil emulsion, oil-in-water emulsion, surface active agents, sodium m-nitrobenzene sulphonate, and organic liquids, for example ethanol.

At the conclusion of the dyeing and/or printing processes it is preferred to subject the so-coloured cellulose textile materials to a "soaping" treatment, which may be carried out by immersing the coloured cellulose textile materials for a short time, for example 15 minutes, in a hot aqueous solution of soap and/or detergent, and subsequently rinsing the coloured cellulose textile material in water before drying it.

Those new dyestuffs which do not contain water-solubilising groups for example sulphonic acid, carboxylic acid, sulphonamide and acylsulphonamide groups are, in general, applied to textile materials in the form of an aqueous dispersion which may be obtained by gravel milling the dyestuff with water in the presence of a dispersing agent, for example the sodium salt of sulphonated naphthalene formaldehyde condensation products, sulphosuccinic acid esters, Turkey red oil, alkyl phenol/ethylene oxide condensation products, soap and similar surface-active materials with or without protective colloids such as dextrin, British gum and water-soluble proteins. If desired the aqueous paste of the dyestuffs so obtained may be dried to form a re-dispersible powder which may be converted to a non-dusting powder by any of the processes known for forming non-dusting powders.

The new dyestuffs, as hereinbefore defined, can be applied to nitrogen-containing textile materials such as wool and polyamide textile materials, from a mildly alkaline, neutral or acid dyebath. The dyeing process can be carried out at a constant or substantially constant pH, that is to say the pH of the dyebath remains constant or substantially constant during the dyeing process, or if desired the pH of the dyebath can be altered at any stage of the dyeing process by the addition of acids or acid salts or alkalis or alkaline salts. For example dyeing may be started at a dyebath pH of about 3.5 to 5.5 and raised during the dyeing process to about 6.5 to 7.5 or higher if desired. The dyebath may also contain substances which are commonly used in the dyeing of nitrogen-containing textile materials. As examples of such substances there may be mentioned ammonium acetate, sodium sulphate, ethyl tartrate, non-ionic dispersing agents such as condensates of ethylene oxide with amines, fatty alcohols or phenols, surface active cationic agents such as quaternary ammonium salts for example cetyl trimethylammonium bromide and cetyl pyridinium bromide and organic liquids such as n-butanol and benzyl alcohol.

We are aware of British specification No. 363,690 which relates to a manufacture of triazine derivatives containing sulphur, by causing a compound of the general formula:

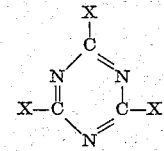

in which X is a halogen atom or any desired residue and in which there is still present at least one halogen atom capable of exchange, to react with one, two or three molecular proportions of a sulphur compound, in which at least one sulphur atom is united on the one hand to a metal and on the other hand to a residue capable of being split off, and causing the product thus obtained, so far as it still contains reactive halogen atoms, to react with a compound having hydrogen atoms that can be exchanged and, if necessary, converting the condensation product thus obtained into the mercapto triazine by treatment with a saponifying or reducing agent. There is no disclosure in the specification that X can be the residue of a dyestuff molecule and that the sulphur compound can be a compound of the Formula III as defined in the present application.

The invention is illustrated but not limited by the following examples in which the parts and percentages are by weight:

*Example 1*

A solution of 22 parts of sodium diethyldithiocarbamate trihydrate in 50 parts of water is added with stirring to a solution of 18 parts of the trisodium salt of 7-(2'-sulphophenylazo)-1-(4":6"-dichloro - 1":3":5" - triazin-2"-ylamino)-8-naphthol-3:6-disulphonic acid (which may be obtained as described in Example 1 of British specification No. 785,222) in 1000 parts of water and the resulting mixture is stirred for 3 hours at a temperature between 20° and 22° C. 150 parts of potassium chloride are then added and the dyestuff which is precipitated is filtered off and dried at a temperature of 40° C. On analysis the dyestuff is found to contain 7 sulphur atoms for each molecule of the dyestuff.

When applied to cellulose textile materials in conjunction with a treatment with an acid-binding agent the dyestuff yields red shades possessing excellent fastness to washing.

Example 2

A solution of 22 parts of sodium diethyldithiocarbamate trihydrate in 100 parts of water is added with stirring to a solution of 15.3 parts of the disodium salt of 2-[4'-(4":6"-dichloro - 1":3":5" - triazin - 2"-ylamino)-2'-methylphenylazo]-naphthalene - 4:8 - disulphonic acid (which may be obtained as described in Example 1 of British specification No. 774,925) in 1000 parts of water. The mixture is then stirred for 20 hours at a temperature of 20° C. 130 parts of sodium chloride are then added and the precipitated dyestuff is filtered off and dried at 40° C. On analysis the dyestuff is found to contain 5.8 atoms of sulphur for each molecule of the dyestuff.

When applied to cellulose textile materials in conjunction with a treatment with an acid-binding agent the dyestuff yields bright yellow shades possessing excellent fastness to washing.

Example 3

A solution of 34 parts of sodium diethyldithiocarbamate trihydrate in 100 parts of water is added with stirring to a solution of 29.3 parts of the trisodium salt of 1-amino - 4 - [4'-(4":6"-dichloro - 1":3":5" - triazin-2"-ylamino)anilino]anthraquinone-2:3':5 - trisulphonic acid (which may be obtained as described in Example 1 of British specification No. 781,930) in a mixture of 650 parts of water and 50 parts of acetone. The mixture is then stirred for 20 hours at a temperature of 20° C. and a 10% aqueous solution of hydrochloric acid is added until the pH of the mixture has fallen to 7.5. 30 parts of sodium chloride are then added and the dyestuff which is precipitated is filtered off, and dried at 40° C. On analysis the dyestuff is found to contain 7 sulphur atoms for each molecule of dyestuff.

When applied to cellulose textile materials in conjunction with a treatment with an acid-binding agent the dyestuff yields bright blue shades possessing excellent fastness to washing.

Example 4

In place of the 34 parts of sodium diethyldithiocarbamate trihydrate used in Example 3 there are used 21 parts of sodium dimethyldithiocarbamate. On analysis the dyestuff so obtained is found to contain 6.7 sulphur atoms for each molecule of dyestuff.

When applied to cellulose textile materials in conjunction with a treatment with an acid-binding agent the dyestuff yields bright blue shades possessing excellent fastness to washing.

Example 5

A solution of 5.03 parts of sodium pentamethylene dithiocarbamate in 60 parts of water is added with stirring to a solution of 8.95 parts of the trisodium salt of 7-(2'-sulphophenylazo) - 1 - 4":6" - dichloro - 1":3":5"-triazin-2"-ylamino) - 8 - naphthol - 3:6 - disulphonic acid (which may be obtained as described in Example 1 of British specification No. 785,222) in 250 parts of water and the resulting mixture is stirred for 2 hours at a temperature between 20° C. and 22° C. and then for 2 hours at a temperature between 30° and 35° C. 80 parts of potassium chloride are then added and the dyestuff which is precipitated is filtered off and dried at a temperature of 40° C. On analysis the dyetuff is found to contain 7 sulphur atoms for each molecule of the dyestuff.

When applied to cellulose textile materials in conjunction with a treatment with an acid-binding agent the dyestuff yields red shades possessing excellent fastness to washing.

Example 6

A solution of 5.03 parts of sodium pentamethylenedithiocarbamate in 60 parts of water is added with stirring to a solution of 7.64 parts of the disodium salt of 2 - [4' - (4":6" - dichloro - 1":3":5" - triazin - 2" - ylamino) - 2' - methylphenylazo] - naphthalene - 4:8 - disulphonic acid (which may be obtained as described in Example 1 of British specification No. 774,925) in 500 parts of water. The mixture is then stirred for 10 hours at a temperature of 20° C. and then for 10 hours at a temperature between 30° C. and 35° C. 70 parts of sodium chloride are then added and the precipitated dyestuff is filtered off and dried at 40° C.

When applied to cellulose textile materials in conjunction with a treatment with an acid-binding agent the dyestuff yields bright yellow shades possessing excellent fastness to washing.

Example 7

A solution of 49.5 parts of sodium diethyldithiocarbamate trihydrate in 400 parts of water is added during 15 minutes to a solution of 51.1 parts of the disodium salt of 1-(4':6'-dichloro-1':3':5'-triazin-2'-ylamino)-8-naphthol-3,6-disulphonic acid in 1200 parts of water, the temperature of the mixture being maintained between 20° C. and 25° C. during and subsequent to the addition. A mixture of 8.58 parts of sodium hydrogen phosphate and 16.42 parts of potassium dihydrogen phosphate are then added and after 20 hours 400 parts of potassium chloride are added. The dipotassium salt of 1-[4':6'-bis(diethyldithiocarbamyl) - 1':3':5' - triazin-2'-ylamino]-8-naphthol-3:6-disulphonic acid which is precipitated is filtered off, washed with ethanol and dried at 20° C.

To a solution of 19.2 parts of the dipotassium salt of 1 - [4':6' - bis(diethyldithiocarbamyl) - 1':3':5' - triazin-2'-ylamino]-8-naphthol-3:6-disulphonic acid in 200 parts of water, which has been previously cooled to a temperature between 5° C. and 10° C., there is gradually added an aqueous solution obtained by diazotising 4.88 parts of the sodium salt of aniline-2-sulphonic acid, the pH of the reaction mixture being maintained between 7 and 8 by the addition of sodium carbonate. The solution is then stirred for 2 hours, 30 parts of potassium chloride are added and the precipitated dyestuff is filtered off. The filter cake so obtained is mixed with 1.03 parts of sodium hydrogen phosphate and 1.97 parts of potassium dihydrogen phosphate and dried at 20° C.

When applied to cellulose textile materials in conjunction with a treatment with an acid-binding agent, with or without the application of heat, bluish-red shades are obtained which are fast to washing.

Example 8

A solution of 5.62 parts of sodium diethyldithiocarbamate trihydrate in 50 parts of water is added with stirring to a solution of 17.9 parts of the trisodium salt of 7 - (2' - sulphophenylazo) - 1 - (4":6" - dichloro - 1":3": 5" - triazin - 2" - ylamino) - 8 - naphthol-3:6-disulphonic acid (which may be obtained as described in Example 1 of British specification No. 785,222) in 400 parts of water and the resulting mixture is stirred for 3 hours at a temperature between 20° C. and 22° C. 100 parts of sodium chloride are then added and the dyestuff which is precipitated is filtered off. The filter cake so obtained is mixed with 0.99 part of disodium hydrogen phosphate and 2.01 parts of potassium dihydrogen phosphate and the mixture is dried at a temperature between 20° and 25° C. On analysis the dyestuff is found to contain 5 sulphur atoms and 1 organically bound chlorine atom for each molecule of dyestuff.

When applied to cellulose textile materials in conjunction with a treatment with an acid-binding agent the dyestuff yields red shades possessing excellent fastness to washing.

The following table gives further examples of the new dyestuffs of the invention which are obtained in the manner described in Examples 1 to 6 by condensing the dithiocarbamic acid derivative listed in the third column of the table with the dichlorotriazinylamino compound which is itself obtained by condensing cyanuric chloride with the aminoazo compound listed in the second column of the table.

the table with the dichlorotriazinylamino compound which is itself obtained by condensing cyanuric chloride with the aminoazo compound listed in the second column of

| Example | Aminoazo compound | Dithiocarbamic acid derivative | Shade on cellulose textile materials |
|---|---|---|---|
| 9 | 1-amino-8-hydroxy-2':7-azonaphthalene-1':3:6-trisulphonic acid | Sodium diethyl dithiocarbamate | Bluish-red. |
| 10 | 1-amino-7-[4'-(phenylazo)-2'-methoxy-5'-methyl-phenylazo]-8-hydroxynaphthalene-3:2'':6-trisulphonic acid | do | Blue. |
| 11 | 1-(3'-aminophenyl)-3-carboxy-4-(1''':5'''-disulphonaphthyl-2''-azo)-5-pyrazolone | do | Yellow. |
| 12 | 2-methylamino-5-hydroxy-6:2'-azonaphthalene-7:1':5'-trisulphonic acid | Sodium di-n-propyl-dithiocarbamate | Orange. |
| 13 | 1-(2':5'-dichlorophenyl)-3-methyl-4-(3'''-aminophenylazo)-5-pyrazolone-4':6''-disulphonic acid | Sodium dicyclohexyl-dithiocarbamate | Yellow. |
| 14 | 2-(4'-amino-2'-methylphenylazo)naphthalene-4:8-disulphonic acid | Sodium dimethyl-dithiocarbamate | Do. |
| 15 | 1-amino-8:2'-dihydroxy-7-(phenylazo)-naphthalene-3:5':6-trisulphonic acid | Sodium diethyl-dithiocarbamate | Blue. |
| 16 | 1-amino-8:2'-dihydroxy-7-(3'-nitrophenylazo)naphthalene-3:5':6-disulphonic acid | do | Do. |
| 17 | 2-amino-6-[2'-methoxy-5'-methyl-4'-(2''':5'''-disulphophenylazo)phenylazo]-5-naphthol-1:7-disulphonic acid | do | Bluish-violet. |
| 18 | 1:2-cobalt complex of 1-(3'-amino-4'-sulphophenyl)-3-methyl-4-(2'-carboxyphenylazo)-5-pyrazolone | do | Yellow. |
| 19 | 1-benzoylamino-7-(3'-aminophenylazo)-8-naphthol-3:6:6'-trisulphonic acid | Sodium diphenyl dithiocarbamate | Red. |
| 20 | 1:2-chromium complex of 2-amino-5-hydroxy-6-(2'-carboxyphenylazo)naphthalene-7-sulphonic acid | Sodium pentamethylene dithiocarbamate | Brown. |

The following table gives further examples of the new dyestuffs of the invention which are obtained by the method described by Example 8 by condensing the dithiocarbamic acid derivative listed in the third column of the table. The fourth column of the table indicates the shades obtained when the dyestuffs are applied to cellulose textile materials in conjunction with a treatment with an acid-binding agent.

| Example | Aminoazo compound | Dithiocarbamic acid derivative | Shade obtained on cellulose textile materials |
|---|---|---|---|
| 21 | 1-amino-7-(2'-sulphophenylazo)-8-naphthol-3:6-disulphonic acid | Sodium N-methyl-N-cyclohexyldithiocarbamate. | Red. |
| 22 | do | Sodium N-ethyl-N-benzyldithiocarbamate | Do. |
| 23 | do | Sodium N-methyl-N-phenyldithiocarbamate. | Do. |
| 24 | 1-amino-7-(phenylazo)-8-naphthol-3:6-disulphonic acid | Sodium diethyldithiocarbamate | Do. |
| 25 | 2-(4'-amino-2'-methylphenylazo)-naphthalene-4:8-disulphonic acid | do | Yellow. |
| 26 | 2-amino-6-(2'-sulphophenylazo)-5-naphthol-7-sulphonic acid | do | Orange. |
| 27 | 2-amino-7-(2'-sulphophenylazo)-8-naphthol-6-sulphonic acid | do | Do. |
| 28 | 1-(2':5'-dichloro-4'-sulphophenyl)-3-methyl-4-(3''-amino-6''-sulphophenylazo)-5-pyrazolone. | do | Yellow. |
| 29 | 1-(2'-chloro-5'-sulphophenyl)-3-methyl-4-(3''-2-amino-6''-sulphophenylazo)-5-pyrazolone. | do | Do. |
| 30 | 2-amino-6-(2'-sulpho-4'-methoxyphenylazo)-5-naphthol-7-sulphonic acid. | do | Scarlet. |
| 31 | 2-amino-7-(2'-sulpho-4'-methoxyphenylazo)-8-naphthol-6-sulphonic acid. | do | Red. |
| 32 | 2-methylamino-7-(2'-sulpho-4'-methoxyphenylazo)-8-naphthol-6-sulphonic acid. | do | Do. |
| 33 | 2-amino-5-hydroxy-6:2'-azonaphthalene-7:1':5'-trisulphonic acid | do | Orange. |
| 34 | 2-methylamino-5-hydroxy-6:2'-azonaphthalene-7:1':5'-trisulphonic acid. | do | Do. |
| 35 | 1:2-chromium complex of 2-amino-6-(2'-carboxy-phenylazo)-5-naphthol-7-sulphonic acid. | do | Brown. |
| 36 | do | Sodium N:N-pentamethylene dithiocarbamate. | Do. |
| 37 | do | Sodium dimethyldithiocarbamate | Do. |
| 38 | do | Sodium N-methyl-N-phenyldithiocarbamate. | Do. |
| 39 | 4-nitro-4'(4''-N-methylaminophenylazo)stilbene-2:2'-disulphonic acid. | Sodium diethyldithiocarbamate | Reddish-yellow. |
| 40 | 1:2-chromium complex of 6-amino-1:2'-dihydroxy-6'-nitro-2:1'-azonaphthalene-3:4'-disulphonic acid. | do | Black. |
| 41 | 2-(3'-amino-6'-sulphophenylazo)-1-naphthol-3:6-disulphonic acid | do | Reddish-orange. |
| 42 | 2-amino-6-(3'-amino-6'-sulphophenylazo)-5-naphthol-7-sulphonic acid. | do | Orange. |
| 43 | 2-amino-6-[2'-sulpho-4'-(4''-sulphophenylazo)phenylazo]-5-naphthol-7-sulphonic acid. | do | Red. |
| 44 | 2-amino-5-hydroxy-6:2'-azonaphthalene-7:4':8'-trisulphonic acid | do | Scarlet. |
| 45 | 2-amino-5-hydroxy-6:2'-azonaphthalene.7:5':7'-trisulphonic acid | do | Do. |
| 46 | 2-(4'-amino-3'-sulphophenylamino)-6-[2''-sulpho-4''-(p-sulphophenylazo)phenylazo]-5-naphthol-7-sulphonic acid. | do | Violet. |
| 47 | 2-amino-7-(3'-amino-6'-sulphophenylazo)-8-naphthol-6-sulphonic acid. | do | Reddish-orange. |
| 48 | 2-amino-8-hydroxy-7:2'-azonaphthalene-6:4':8'-trisulphonic acid | do | Red. |
| 49 | 2-amino-8-hydroxy-7:2'-azonaphthalene-6:1':5'-trisulphonic acid | do | Do. |
| 50 | 1-amino-7-(3'-sulphophenylazo)-8-naphthol-3:6-disulphonic acid | do | Bluish-red. |
| 51 | 1-amino-7-(2'-sulpho-4'-chlorophenylazo)-8-naphthol-3:6-disulphonic acid. | do | Do. |
| 52 | 1-amino-7-(2'-sulpho-4'-methoxyphenylazo)-8-naphthol-3:6-disulphonic acid. | do | Rubine. |
| 53 | 1-amino-7-(3'-amino-6'-sulphophenylazo)-8-naphthol-3:6-disulphonic acid. | do | Bluish-red. |
| 54 | 1-amino-7-(2'-sulphophenylazo)-8-naphthol-4:6-disulphonic acid | do | Red. |
| 55 | 1-amino-8-hydroxy-7:2'-azonaphthalene-3:6:1'-trisulphonic acid | do | Rubine. |
| 56 | 1-amino-7-(4'-sulphophenylazo)-8-naphthol-4:6-disulphonic acid | do | Bluish-red. |
| 57 | 2-(2'-acetylamino-4'-aminophenylazo)naphthalene-4:8-disulphonic acid. | do | Reddish-yellow. |
| 58 | 2-(2'-methyl-4'-aminophenylazo)naphthalene-5:7-disulphonic acid | do | Do. |
| 59 | 2-[2'-methyl-4'-(4''-amino-2''-phenylazo)phenylazo]naphthalene-4:8-disulphonic acid. | do | Brownish-orange. |
| 60 | 1-(2'-sulphophenyl)-3-methyl-4-(3''-amino-6''-sulphophenylazo)-5-pyrazolone. | do | Yellow. |
| 61 | 1-(3'-aminophenyl)-3-methyl-4-(1'':5''-disulphonaphthyl-2''-azo)-5-pyrazolone. | do | Do. |

| Example | Aminoazo compound | Dithiocarbamic acid derivative | Shade obtained on cellulose textile materials |
|---|---|---|---|
| 62 | 1-(4'-aminophenyl)-3-methyl-4-(1″:5″-disulphonaphthyl-2″-azo)-5-pyrazolone. | Sodium diethyldithiocarbamate | Yellow |
| 63 | 1-(3'-amino-4'-sulphophenyl)-3-methyl-4-(1″-sulphonaphthyl-2″-azo)-5-pyrazolone. | do | Do. |
| 64 | 1-(4':8'-disulphonaphth-2'-yl)-3-methyl-4-(3″-amino-6″-sulphophenylazo)-5-pyrazolone. | do | Do. |
| 65 | 1-(3'-amino-6'-sulphophenylazo)-2-naphthol-6-sulphonic acid | do | Orange. |
| 66 | 1-(3'-amino-6'-sulphophenylazo)-2-naphthol-6:8-disulphonic acid | do | Do. |
| 67 | 2-(3'-amino-6'-sulphophenylazo)-1-naphthol-3-sulphonic acid | Sodium dimethyldithiocarbamate | Do. |
| 68 | 2-(3'-amino-6'-sulphophenylazo)-1:8-dihydroxynaphthalene-3:6-disulphonic acid. | do | Bluish-red. |
| 69 | 1-(3'-amino-6'-sulphophenylazo)-2-amino-8-naphthol-6-sulphonic acid. | do | Red. |
| 70 | 1-acetylamino-7-(3'-amino-6'-sulphophenylazo)-8-naphthol-3:6-disulphonic acid. | do | Do. |
| 71 | 1-acetylamino-7-(3'-amino-6'-sulphophenylazo)-8-naphthol-4:6-disulphonic acid. | do | Do. |
| 72 | 1-benzoylamino-7-(3'-amino-6'-sulphophenylazo)-8-naphthol-3:6-disulphonic acid. | do | Do. |
| 73 | 2-propionylamino-6-(3'-amino-6'-sulphophenylazo)-5-naphthol-7-sulphonic acid. | do | Yellowish-red. |
| 74 | 2-benzoylamino-6-(3'-amino-6'-sulphophenylazo)-5-naphthol-7-sulphonic acid. | Potassium diethyldithiocarbamate | Do. |
| 75 | 2-amino-7-(3'-amino-6'-sulphophenylazo)-8-naphthol-6-sulphonic acid. | do | Do. |
| 76 | 1-(4'-amino-2'-sulphophenylazo)-2-naphthol-8-sulphonic acid | do | Red. |
| 77 | 2-acetylamino-6-(4'-amino-2'-sulphophenylazo)-5-naphthol-7-sulphonic acid. | Sodium di-n-propyldithiocarbamate | Yellowish-red. |
| 78 | 2-acetylamino-7-(4'-amino-2'-sulphophenylazo)-8-naphthol-6-sulphonic acid. | do | Red. |
| 79 | 1-(4'-amino-2'-sulphophenylazo)-2-amino-8-naphthol-6-sulphonic acid. | do | Bluish-red. |
| 80 | 1-acetylamino-7-(4'-amino-2'-sulphophenylazo)-8-naphthol-3:6-disulphonic acid. | do | Violet. |
| 81 | 1-benzoylamino-7-(4'-amino-2'-sulphophenylazo)-8-naphthol-4:6-disulphonic acid. | do | Bordeaux. |
| 82 | 1-(3'-aminophenyl)-3-methyl-4-(2″:5″-disulphophenylazo)-5-pyrazolone. | do | Yellow. |
| 83 | 1-(3'-aminobenzoylamino)-7-(2″-sulphophenylazo)-8-naphthol-3:6-disulphonic acid. | do | Red. |
| 84 | 1-(4'-aminosulphonaphth-1'-ylazo)-4-(8″-sulphonaphth-1″-ylazo) naphthalene sulphonic acid. | do | Reddish-brown. |
| 85 | 1-amino-2-(4'-aminophenylazo)-7-(4″-sulphophenylazo)-8-naphthol-3:6-disulphonic acid. | do | Green. |
| 86 | 1-(4'-aminobenzoylamino)-7-(2″-sulphophenylazo)-8-naphthol-3:6-disulphonic acid. | do | Red. |
| 87 | 1-amino-7-(2'-sulphophenylazo)-8-naphthol-3:6-disulphonic acid | Sodium 4-morpholinodithiocarbamate | Do. |
| 88 | do | Sodium N-methyl-N-phenyldithiocarbamate. | Do. |
| 89 | do | Sodium N:N-di-isobutyldithiocarbamate | Do. |
| 90 | 1-amino-7-(2'sulphophenylazo)-8-naphthol-3:6-disulphonic acid | Sodium N:N-pentamethylenedithiocarbamate. | Do. |
| 91 | 2-amino-6-[2'-methoxy-5'-methyl-4'-(2″:5″-disulphophenylazo) phenylazo]-5-naphthol-1:7-disulphonic acid. | Sodium diethyldithiocarbamate | Bluish-violet. |

*Example 92*

In place of the 18 parts of the trisodium salt of the azo compound used in Example 1 there are used 14.5 parts of the disodium salt of 4-(4″:6″-dichloro-1″:3″:5″-triazin-2″-ylamino)-2'-nitrodiphenylamine-3:4'-disulphonic acid (which may be obtained by condensing cyanuric chloride with 4-amino-2'-nitro-diphenylamine-3:4'-disulphonic acid).

The dyestuff so obtained when applied to cellulose textile materials in conjunction with a treatment with an acid-binding agent yields yellow shades possessing excellent fastness to wet treatments.

*Example 93*

A solution of 19.6 parts of the trisodium salt of 1-amino-4 - [4' - (4″:6″-dichloro-1″:3″:5″-triazin-2″-ylamino] anilinoanthraquinone-2:3':5-trisulphonic acid (which may be obtained as described in Example 1 of British specification No. 781,930) in 400 parts of water is stirred at 20° C. and a solution of 5.63 parts of sodium diethyldithiocarbamate trihydrate in 50 parts of water is added during 15 minutes. The mixture is stirred at 20° C. until reaction is complete and sodium chloride is then added. The precipitated dyestuff is then filtered off, washed with brine solution and dried at 20° C.

On analysis the dyestuff so obtained is found to contain 1.1 atoms of organically bound chlorine and 4.9 atoms of sulphur per molecule of dyestuff. When applied to cellulose textile materials in conjunction with a treatment with an acid-binding agent the dyestuff yields blue shades possessing excellent fastness to wet treatments.

*Example 94*

In place of the 19.6 parts of the trisodium salt used in Example 93 there are used 17.0 parts of the disodium salt of 1 - amino-4-[3'-(4″:6″-dichloro-s-triazin-2″-yl) amino]anilinoanthraquinone-2:4'-disulphonic acid (which may be obtained as described in Example 2 of Belgian specification No. 556,092).

When applied to cellulose textile materials in conjunction with a treatment with an acid-binding agent the dyestuff so obtained yields reddish-blue shades possessing excellent fastness to wet treatments.

*Example 95*

The dihalogenotriazinylamino derivatives of metal phthalocyanines obtained as described in Examples 1, 2, 3, 8 and 14 of British specification No. 805,562 are reacted with sodium diethyldithiocarbamate by the method of Example 8 using one molecular proportion of sodium diethyldithiocarbamate for each dihalogenotriazinylamino group present in the metal phthalocyanines. The dyestuffs so obtained when applied to cellulose textile materials in conjunction with a treatment with an acid-binding agent yield respectively greenish-blue, turquoise-blue, greenish-blue, greenish-blue and greenish-blue shades which possess excellent fastness to wet treatments.

*Example 96*

A solution of 10.1 parts of cyanuric chloride in 40 parts of acetone is slowly added with stirring to a mixture of 16.8 parts of 4'-amino-2-nitrodiphenylamine-4-sulphondimethylamide, 8.4 parts of sodium bicarbonate, 30 parts of water and 360 parts of acetone, the temperature of the resulting mixture being maintained between 15° and 25° C., and the pH of the mixture being maintained at 6.4 by the addition of an 8% aqueous solution of sodium bicarbonate. The mixture is stirred for 1 hour at the above temperature. The mixture is filtered and the residual solid is then washed with 100 parts of acetone. The combined filtrates are cooled to a temperature of 5° C. and a solution of 13.4 parts of sodium diethyldithiocarbamate trihydrate in 50 parts of water is then slowly added, the temperature of the mixture being maintained between 5° and 10° C. and the pH of the mixture being maintained at 8 by the addition of an aqueous solution of sodium carbonate. The mixture is then stirred for 1 hour and the solution so obtained is poured into 3000 parts of water at a temperature of 1° C. The precipitated dyestuff is then filtered off, washed with water and dried.

On analysis the dyestuff so obtained is found to contain 1 atom of organically bound chlorine and 3 atoms of sulphur per molecule of dyestuff.

When dispersed in aqueous medium the dyestuff colours wool and polyamide textile materials in bright yellow shades which possess excellent fastness to wet treatments.

*Example 97*

A solution of 27.6 parts of sodium diethyldithiocarbamate trihydrate in a mixture of 200 parts of water and 1200 parts of dioxan is added with stirring to a solution of 36.3 parts of 2-hydroxy-4'-(4":6"-dichloro-1":3":5"-triazin-2"-ylamino)-5-methylazobenzene (which may be obtained in condensing cyanuric chloride with 2-hydroxy-4'-amino-5-methylazobenzene) in 1600 parts of dioxan, and the mixture so obtained is then stirred for 45 hours at a temperature between 20° and 30° C. The mixture is then poured into 8000 parts of a 5% aqueous solution of sodium chloride and the dyestuff which is precipitated is filtered off and dried.

On analysis the dyestuff so obtained is found to contain 1 atom of organically bound chlorine and 2 atoms of sulphur per molecule of dyestuff. When dispersed in aqueous medium the dyestuff colours polyamide textile materials in bright greenish-yellow shades of excellent fastness to light.

*Example 98*

A mixture of 6.18 parts of sodium diethyldithiocarbamate trihydrate, 3.4 parts of 1-amino-4-[4'-(4":6"-dichloro - 1":3":5"-triazin-2"-ylamino)-anilino]anthraquinone and 165 parts of dioxan is stirred for 24 hours at a temperature of 25° C. The mixture is then filtered and the filtrate so obtained is added to 400 parts of a 10% aqeous solution of sodium chloride. The dyestuff which is precipitated is then filtered off, washed with water and dried.

On analysis the dyestuff so obtained is found to contain 0.9 atom of organically bound chlorine and 2.1 atoms of sulphur per molecule of dyestuff.

When dispersed in aqueous medium the dyestuff colours polyamide textile materials in blue shades possessing excellent fastness to wet treatments.

*Example 99*

A mixture of 1.5 parts of aniline, 8.3 parts of the dyestuff of Example 8, 10 parts of acetone and 200 parts of water is stirred at a temperature between 35° and 40° C. for 2 hours, the pH of the mixture being maintained between 7 and 8 by the gradual addition of a 10% aqueous solution of sodium carbonate. 12 parts of sodium chloride are then added and the dyestuff which is precipitated in filtered off and dried.

On analysis the dyestuff so obtained is found to contain 5 sulphur atoms, but no atom of organically bound chlorine per molecule of dyestuff. When applied to cellulose textile materials in conjunction with a treatment with an acid-binding agent the dyestuff yields red shades which possess excellent fastness to wet treatments.

A similar dyestuff is obtained when the 1.5 parts of aniline used in the above example are replaced by 1.28 parts of sodium phenate.

*Example 100*

A mixture of 2.11 parts of 4-amino-2-methylazobenzene, 4.06 parts of 2-chloro-4-(N:N-diethylthiocarbamylthio)-6-phenyl-1:3:5-triazine, 1.26 parts of sodium bicarbonate and 100 parts of dioxan is stirred at the boil under a reflux condenser for 8 hours. The mixture is then added to 200 parts of a 10% aqueous solution of brine and the dyestuff which is precipitated is filtered off, washed with water and dried.

The dyestuff so obtained, when dispersed in aqueous medium, dyes wool and polyamide textile materials in yellow shades which possess excellent fastness to washing.

The 2-chloro-4-(N:N-diethylthiocarbamylthio)-6-phenyl-1:3:5-triazine used in the above example may be obtained as follows:

A solution of 5.6 parts of sodium diethyldithiocarbamate trihydrate in 100 parts of water is added over 1 hour with stirring to a suspension of 5.6 parts of 2:4-dichloro-6-phenyl-1:3:5-triazine in a mixture of 30 parts of acetone and 200 parts of water, the temperature of the mixture being maintained at 15° C. The mixture is then stirred for a further 45 minutes at 15° C., and the precipitate is then filtered off, washed with water and dried. After crystallisation from a light petroleum ether (boiling point 60° to 80° C.) the 2-chloro-4-(N:N-diethylthiocarbamylthio)-6-phenyl-1:3:5-triazine melts at 67° to 68° C. On analysis the product is found to contain 49.6% of carbon, 4.7% of hydrogen, 16.6% of nitrogen, 11.2% of chlorine and 17.7% of sulphur. ($C_{14}H_{15}N_4ClS_2$ requires 49.9% of carbon, 4.45% of hydrogen, 16.6% of nitrogen, 10.6% of chlorine and 18.9% of sulphur.)

*Example 101*

A mixture of 9.6 parts of the dyestuff of Example 15, 3 parts of copper sulphate pentahydrate and 130 parts of water is stirred for 4 hours at a temperature between 25° and 30° C., the pH of the mixture being maintained between 6.0 and 6.5 by the gradual addition of an aqueous solution of sodium carbonate. An aqueous solution of sodium carbonate is then added until the pH of the mixture is 7 and the mixture is filtered. 40 parts of sodium chloride are added to the filtrate which is obtained and the dyestuff which is precipitated is filtered off. The filter-cake so obtained is mixed with 0.99 part of disodium hydrogen phosphate and 2.01 parts of potassium dihydrogen phosphate and the mixture is then dried.

On analysis the dyestuff so obtained is found to contain 1 atom of copper and 7 atoms of sulphur per molecule of dyestuff. When applied to cellulose textile materials in conjunction with a treatment with an acid-binding agent the dyestuff yields violet shades possessing excellent fastness to washing.

In place of the 9.6 parts of the dyestuff of Example 15 used in the above example there are used equivalent amounts of the dyestuffs of Examples 16, 17 and 91 whereby copper-containing dyestuffs are obtained which when applied to cellulose textile materials in conjunction with a treatment with an acid-binding agent yield violet, navy-blue and navy-blue shades respectively which possess excellent fastness to washing.

*Example 102*

100 parts of bleached cotton fabric are padded through an aqueous solution containing 2% of the dyestuff of Example 1, 1% of sodium bicarbonate and 0.2% of an alkylated phenol/ethylene oxide condensate, at a temperature of 18° C. and the cotton fabric is then squeezed between rollers until its weight is 200 parts. The cotton fabric is dried at 70° C. and is then exposed to steam at a temperature of 102° C. for 1 minute. The coloured cotton fabric is then rinsed in water, immersed for 15 minutes in a 0.2% aqueous solution of soap, rinsed again in water and finally dried.

The cotton fabric is thereby coloured a bright red shade possessing excellent fastness to washing.

In place of the 2% of the dyestuff of Example 1 used in the above example there is used 2% of the dyestuff of Example 2 or 2% of the dyestuff of Example 3 or 2% of the dyestuff of Example 5 or 2% of the dyestuff of Example 8 whereby the cotton fabric is coloured in bright yellow, bright blue, bright red and bright red shades respectively, which possess excellent fastness to washing.

*Example 103*

100 parts of bleached cotton yarn are immersed in a dyebath comprising 2 parts of the dyestuff of Example 3 and 90 parts of sodium chloride dissolved in 3000 parts of water and dyeing is carried out for 30 minutes at a temperature of 20° C. 15 parts of sodium carbonate are then added and dyeing is continued for 60 minutes at 20° C. The dyed cotton yarn is then removed from the dyebath, rinsed in water, immersed for 5 minutes in a 0.2% aqueous solution of a synthetic detergent at a temperature of 100° C., rinsed again in water and finally dried. The cotton yarn is dyed a brilliant blue shade which is fast to washing.

In place of the 2 parts of the dyestuff of Example 3 used in the above example there are used 2 parts of the dyestuff of Example 1, or 2 parts of the dyestuff of Example 33 or 2 parts of the dyestuff of Example 60 whereby the cotton yarn is dyed in bright red, bright orange and bright yellow shades respectively, which possess excellent fastness to washing.

*Example 104*

100 parts of bleached cotton fabric are padded through an aqueous solution containing 0.2% of the dyestuff of Example 1 and 2% of sodium carbonate and the cotton fabric is then passed between rollers until its weight is 200 parts. The cotton fabric is then rolled up and stored for 4 hours at a temperature of 20° C. The cotton fabric is then rinsed in water, immersed for 5 minutes in a 0.2% aqueous solution of a synthetic detergent at a temperature of 100° C., rinsed again in water and dried. The cotton fabric is coloured a bright red shade possessing excellent fastness to washing.

*Example 105*

100 parts of woollen cloth are immersed in a dyebath comprising a solution of 1.5 parts of the dyestuff of Example 30, 3.0 parts of ammonium acetate, 0.5 part of cetyltrimethylammonium bromide and 1.0 part of a condensate of ethylene oxide with a fatty alcohol in 5000 parts of water, and dyeing is carried out for 1 hour at a temperature of 100° C. The dyed woollen cloth is then removed from the dyebath, rinsed in water and dried. The woollen cloth is dyed a scarlet shade possessing excellent fastness to washing.

*Example 106*

A print paste comprising:

| | Parts |
|---|---|
| The dyestuff of Example 92 | 3 |
| Urea | 10 |
| Water | 50.5 |
| Sodium bicarbonate | 1.5 |
| 4% aqueous solution of sodium alginate | 35 |
| | 100 | is applied to unmercerised cotton cloth by machine printing. The printed cotton cloth is dried at a temperature of 70° C. and is then steamed for 6 minutes at a temperature of 100° C. The printed cotton cloth is then rinsed in water, immersed for 10 minutes in a 0.3% aqueous solution of a synthetic detergent at a temperature of 100° C., rinsed again in water and finally dried.

The cotton cloth is thereby printed a brown shade which possesses excellent fastness to wet treatments.

In place of the unmercerised cotton cloth used in the above example there may be used mercerised sateen cloth or viscose rayon cloth when brown prints are also obtained which possess excellent fastness to wet treatments.

In place of the 3 parts of the dyestuff of Example 92 used in the above example there are used 3 parts of the dyestuff of Example 1, or 3 parts of the dyestuff of Example 3 or 3 parts of the dyestuff of Example 24 or 3 parts of the dyestuff of Example 93 or 3 parts of the second dyestuff of Example 99 whereby there are obtained red, blue, red, blue and red prints respectively which possess excellent fastness to washing.

The following table gives further examples of dyestuffs of the invention which are obtained when the 1.5 parts of aniline used in Example 99 are replaced by equivalent amounts of the compounds listed in the second column of the table, and/or the 8.3 parts of the dyestuff of Example 8 used in Example 99 are replaced by equivalent amounts of the dyestuffs listed in the third column of the table. The fourth column of the table indicates the shades obtained when the dyestuffs are applied to cellulose textile materials in conjunction with a treatment with an acid-binding agent.

| Example | Compound | Dyestuff | Shade |
|---|---|---|---|
| 107 | Ammonium hydroxide | Dyestuff of Example 8 | Red. |
| 108 | Methylamine | do | Do. |
| 109 | Ethylamine | do | Do. |
| 110 | Dimethylamine | do | Do. |
| 111 | β-Hydroxyethylamine | do | Do. |
| 112 | Di(β-hydroxyethyl)amine | do | Do. |
| 113 | Sodium sulphite | do | Do. |
| 114 | Cyclohexylamine | do | Do. |
| 115 | Morpholine | do | Do. |
| 116 | Piperidine | do | Do. |
| 117 | N-methylaniline | do | Do. |
| 119 | do | Dyestuff of Example 25 | Yellow. |
| 120 | Sulphanilic acid | do | Do. |
| 121 | m-Aminobenzoic acid | Dyestuff of Example 30 | Scarlet. |
| 122 | 3-sulpho-N-methylaniline | Dyestuff of Example 35 | Brown. |
| 123 | 5-sulpho-anthranilic acid | do | Do. |
| 124 | 3:5-disulphoaniline | Dyestuff of Example 8 | Red. |
| 125 | 2:5-disulphoaniline | do | Do. |
| 126 | 3:5-disulpho-N-methylaniline | do | Do. |
| 127 | 3-methylamino-benzoic acid | do | Do. |
| 128 | 5-sulpho-2-methylaminobenzoic acid | do | Do. |
| 129 | Ammonium hydroxide | Dyestuff of Example 36 | Brown. |

Example 130

In place of the 17.9 parts of the trisodium salt of the azo compound used in Example 8 there are used 19.9 parts of the trisodium salt of 7-(2'-sulphophenylazo)-1-(4":6"-dibromo-1":3":5"-triazin-2"-ylamino) - 8 - naphthol-3:6-disulphonic acid (which may be obtained as described in the example of British specification No. 838,343) when a similar red dyestuff is obtained which, on analysis is found to contain 5 sulphur atoms and one organically bound bromine atom per molecule of dyestuff.

Example 131

In place of the 4.06 parts of 2-chloro-4-(N:N-diethylthiocarbamylthio)-6-phenyl-1:3:5-triazine used in Example 100 there are used 6.16 parts of 2-chloro-4-(N:N-diethylthiocarbamylthio) - 6 - (3':5'-disulphophenylamino)-1:3:5-triazine or 3.5 parts of 2-chloro-4-(N:N-diethylthiocarbamylthio)-6-methoxy-1:3:5-triazine or 3.34 parts of 2-chloro-4-(N:N-diethylthiocarbamylthio)-6-amino-1:3:5-triazine or 5.38 parts of 2-chloro-4-(N:N-diethylthiocarbamylthio)-6-(N-m-sulphophenyl-N-methylamino)-1:3:5-triazine or 3.34 parts of 2-chloro-4-(N:N-diethylthiocarbamylthio)-6-methyl-1:3:5-triazine when similar yellow dyestuffs are obtained.

The triazine derivatives used in the above example may themselves be obtained by the method described in Example 100 for the preparation of 2-chloro-4-(N:N-diethylthiocarbamylthio)-6-phenyl-1:3:5-triazine except that the 5.6 parts of 2:4-dichloro-6-phenyl-1:3:5-triazine are replaced by equivalent amounts of 2:4-dichloro-6-(3':5'-disulphophenylamino)-1:3:5-triazine,
2:4-dichloro-6-methoxy-1:3:5-triazine,
2:4-dichloro-6-amino-1:3:5-triazine,
2:4-dichloro-6-(N-m-sulphophenyl-N-methylamine)-1:3:5-triazine or
2:4-dichloro-6-methyl-1:3:5-triazine respectively.

Example 132

A solution of 3.0 parts of sodium dimethyldithiocarbamate in 15 parts of water is added to a solution of 3.0 parts of the disodium salt of 1-(4':6'-dichloro-1':3':5'-triazin-2'-amino)-7-phenylazo-8-naphthol-3:6-disulphonic acid (which is obtained as described in Example 1 of United States patent specification No. 1,667,312) in 70 parts of water, and the resulting mixture is stirred for 16 hours at 20° C. The mixture is then filtered and 18 parts of sodium chloride are added to the resulting filtrate. The dyestuff which is precipitated is then filtered off, washed with a 20% aqueous solution of sodium chloride and dried.

On analysis the dyestuff is found to contain 6 sulfur atoms per molecular of dyestuff. When applied to cellulose textile materials in conjunction with a treatment with an acid-binding agent the dyestuff yields red shades possessing excellent fastness to light and to wet treatments. The dyestuff also possesses excellent stability to storage and this is superior to the stability to storage of the first dyestuff of Example 1 of United States patent specification No. 1,667,312.

What we claim is:

1. Dyestuffs of the formula:

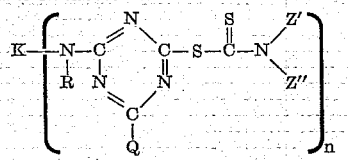

wherein
K represents the radical of a dyestuff selected from the class consisting of azo, anthraquinone, nitro and phthalocyanine dyestuff radicals;
R represents a member selected from the class consisting of hydrogen and lower alkyl;
n is a positive integer not exceeding 2;
Q is a member selected from the class consisting of chlorine, bromine, lower alkyl, phenyl, lower alkoxy, sulponic acid, phenoxy, amino, lower alkylamino, hydroxy lower alkylamino, phenylamino, sulphophenylamino, carboxyphenylamino, N-phenyl-N-lower alkylamino, N-sulphophenyl-N-lower alkylamino, carboxy-sulphophenylamino, N-(carboxysulphophenyl)-N-lower alkylamino, N-carboxyphenyl-N-lower alkylamino, disulphophenylamino, N-disulphophenyl-N-lower alkylamino, cyclohexylamino, morpholino, piperidyl and

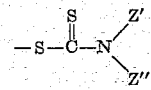

and Z' and Z" are independently selected from the class consisting of lower alkyl, phenyl lower alkyl, cyclohexyl and phenyl, and taken together Z' and Z" form with the nitrogen atom N a heterocyclic ring selected from the class consisting of piperidyl and morpholino.

2. Dyestuffs of the formula:

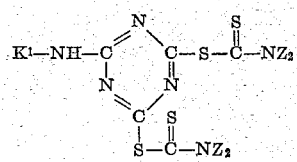

wherein K' is an azo dyestuff radical, and Z is a lower alkyl radical.

3. Dyestuffs of the formula:

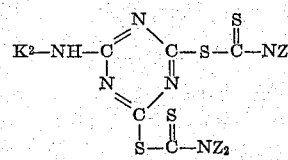

wherein $K^2$ is an anthraquinone dyestuff radical, and Z is a lower alkyl radical.

4. Dyestuffs of the formula:

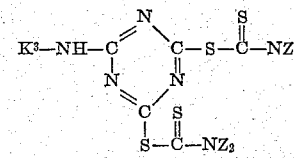

wherein $K^3$ is a phthalocyanine dyestuff radical, and Z is a lower alkyl radical.

5. Dyestuffs of the formula:

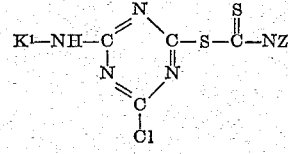

wherein $K^1$ is an azo dyestuff radical, and Z is a lower alkyl radical.

6. Dyestuffs of the formula:

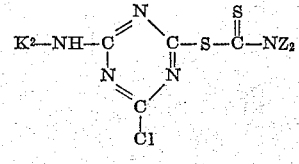

wherein $K^2$ is an anthraquinone dyestuff radical, and Z is a lower alkyl radical.

7. The dyestuff which, in the form of the free acid, is of the formula:
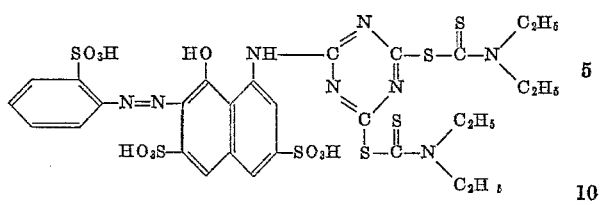
8. The dyestuff which, in the form of free acid, is of the formula
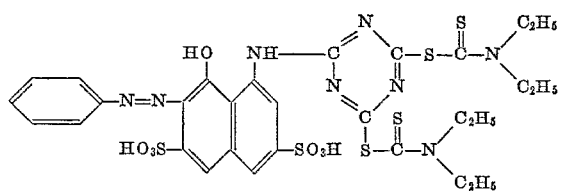
9. The dyestuff which, in the form of free acid, is of the formula
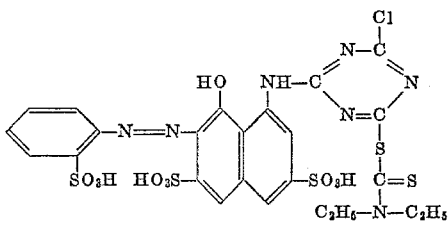
References Cited by the Examiner
UNITED STATES PATENTS
| | | | |
|---|---|---|---|
| 1,667,312 | 4/28 | Fritzsche et al. | 260—153 |
| 2,061,520 | 11/36 | Orthner et al. | 260—249.5 |
| 2,892,671 | 6/59 | Alsberg et al. | 260—153 |
| 2,979,498 | 4/61 | Andrew et al. | 260—153 |
FOREIGN PATENTS
570,524  2/59  Belgium.
CHARLES B. PARKER, *Primary Examiner.*